US008258449B1

(12) United States Patent
Matthews

(10) Patent No.: US 8,258,449 B1
(45) Date of Patent: Sep. 4, 2012

(54) NARROWBAND SOLAR CALIBRATION SYSTEM FOR A RADIOMETRIC SYSTEM

(75) Inventor: Grant Matthews, Fort Wayne, IN (US)

(73) Assignee: Exelis, Inc., McLean, VA (US)

( * ) Notice: Subject to any disclaimer, the term of this patent is extended or adjusted under 35 U.S.C. 154(b) by 0 days.

(21) Appl. No.: 12/542,885

(22) Filed: Aug. 18, 2009

(51) Int. Cl.
*G01J 1/20* (2006.01)
(52) U.S. Cl. .................. 250/203.1; 356/121; 359/399
(58) Field of Classification Search ............ 250/203.1; 359/399–431; 356/121–127
See application file for complete search history.

(56) References Cited

U.S. PATENT DOCUMENTS

| | | | | |
|---|---|---|---|---|
| 3,519,823 | A * | 7/1970 | Snyder et al. ............ | 250/203.6 |
| 5,218,416 | A | 6/1993 | Haring et al. | |
| 5,659,168 | A * | 8/1997 | Dey et al. ............... | 250/208.1 |
| 5,672,866 | A * | 9/1997 | Messina ................. | 250/252.1 |
| 6,111,640 | A | 8/2000 | Hedman et al. | |
| 6,278,100 | B1 * | 8/2001 | Friedman et al. ......... | 250/201.9 |
| 6,455,830 | B1 * | 9/2002 | Whalen et al. ........... | 250/203.1 |
| 7,166,825 | B1 * | 1/2007 | Smith et al. ............. | 250/203.4 |
| 7,321,654 | B2 * | 1/2008 | Cho et al. .............. | 378/158 |
| 7,482,572 | B1 * | 1/2009 | Galvin ................. | 250/216 |
| 8,067,738 | B1 * | 11/2011 | Heath et al. ............ | 250/338.1 |

OTHER PUBLICATIONS

Matthews, Grant, Celestial Body Irradiance Determination From An Underfilled Satellite Radiometer: Application To Albedo And Thermal Emission Measurements Of The Moon Using CERES, Applied Optics; vol. 47, No. 27, Sep. 20, 2008.

Matthews, Grant, "In-Flight Spectral Characterization And Calibration Stability Estimates For The Clouds And The Earth's Radiant Energy System (CERES)", Journal of Atmospheric and Oceanic Technology, vol. 26, Sep. 2009.

* cited by examiner

*Primary Examiner* — Seung C Sohn
(74) *Attorney, Agent, or Firm* — RatnerPrestia

(57) ABSTRACT

A system for calibrating a broadband detector includes a first narrowband telescope for viewing a celestial body, and an earth viewing telescope. The broadband detector is selectively coupled to the first narrowband telescope or the earth viewing telescope. A first narrowband filter is selectively inserted in an optical path of the first narrowband telescope, or the earth viewing telescope. A processor is configured to calibrate the broadband detector based on viewing the celestial body with the first narrowband telescope or the earth viewing telescope, and selectively inserting the first narrowband filter in the optical path. The first narrowband telescope includes a first narrowband filter inside its optical train. The first narrowband filter, which is selectively inserted in the optical path, is spectrally similar to the first narrowband filter inside the optical train of the first narrowband telescope. In addition, a second narrowband telescope, which receives a different wavelength from the first narrowband telescope includes a second narrowband filter inside its optical train. In addition, a second narrowband filter, which is selectively inserted in the optical path of the second narrowband telescope, is spectrally similar to the second narrowband filter inside the optical train of the second narrowband telescope. By using the first and second narrowband telescopes and the first and second narrowband filters, the broadband detector may be calibrated at two different wavelengths.

20 Claims, 12 Drawing Sheets

NARROWBAND SOLAR CALIBRATION SYSTEM FOR A RADIOMETRIC SYSTEM

TECHNICAL FIELD

The present invention relates, in general, to the field of radiometry and, more specifically, to a system and method for radiometric calibration of climate monitoring remote sensors in space, employing solar radiation as a source.

BACKGROUND OF THE INVENTION

The Clouds and the Earth's Radiant Energy System (CERES) is a satellite program monitoring global earth radiation budget (ERB) parameters from space on the polar orbiting Terra and Aqua satellite platforms. Flight models one and two (FM1 and FM2) operate on Terra and models three and four (FM3 and FM4) operate on Aqua. The CERES program requires an absolute accuracy of 1% in measurements of short wave (SW) earth radiance (between 0.2 and 5 µm) and an absolute accuracy of 0.5% for emitted thermal long wave (LW) radiance (between 5<λ<200 µm).

The CERES instruments are presently the most accurate earth observing radiometers flown in space. The CERES instruments also have the capability to view the moon on every one of the Terra or Aqua sun-synchronous orbits. However the CERES field-of-view (FOV) is approximately ten times larger than the extent of the lunar disk seen from a low earth orbit. In addition, each CERES detector has a non-uniform spatial response within its FOV and a finite time response. This complicates attempts to measure absolute lunar radiance directly, as is done for the ERB.

The CERES radiometer (also referred to herein as the CERES instrument) is shown in FIGS. 1a and 1b. Each CERES instrument is a scanning radiometer with three co-aligned channels (also referred to as telescopes), as pictured in FIG. 1a. These include the short wave (SW) telescope which uses a quartz fused silica filter to select radiance in the range of 0.2<λ<5 µm; and a window (WN) telescope, which uses a zinc sulphide/cadmium telluride filter to only select thermal radiance in a specific region (8<λ<12 µm). In addition, an ERB long wave (LW) measurement is obtained using a third total telescope, which has no filtering optics, so it receives all the energy in the range 0.2<λ<200 µm. The CERES radiometer is gimballed to move in elevation and azimuth, as shown.

Daytime thermal measurements are obtained after subtraction of the SW channel signal from that of the total channel. The three CERES channel spectral responses are plotted in FIG. 1c, showing, as examples, scattered solar and lunar spectra.

Each CERES channel uses a thermistor bolometer detector that measures radiance by converting photon energy into heat. Equation 1 provides a representation of how the voltage output of a CERES channel relates to the radiant input $L(\lambda,\theta,\phi,t)$ at time t:

$$V(t) = g \int_{-\infty}^{t} [\alpha_1 \eta_1 \exp(-\alpha_1(t-t')) + \alpha_2 \eta_2 \exp(-\alpha_2(t-t'))] \times \int_0^{2\pi} P(\theta,\phi) \times \int_0^{200} r(\lambda) L(\lambda,\theta,\phi,t') \, d\lambda d\Omega dt' \quad (1)$$

where 'g' is a constant that gives the voltage output of the detector per unit quantity of heat energy converted in the thermistor; $r(\lambda)$ is the spectral response of the CERES channel that gives the fraction of incident radiance at wavelength λ which is converted into heat energy within the detector; and $P(\theta,\phi)$ is the telescope's FOV response, often referred to as a point spread function (PSF).

Wavelength dependent broadening of the PSF due to diffraction is assumed to be minimal, hence $P(\theta,\phi)$ is not represented as a function of λ. Because they are thermal detectors, the CERES bolometers have a finite time response to energy input. In the CERES instruments, this results in a fast time response and a slow time response of the detector. The first and fastest response has a time lag of around 8 ms ($\alpha_1^{-1}$) and represents about 99% of the signal (i.e. $\eta_1 \approx 0.99$). It is known, however, that the detectors also have a slower second time constant, due to non-infinite thermal mass of the detector mountings. This results in a further 1% rise ($\eta_2 \approx 0.01$; $\eta_1 + \eta_2 = 1$) in detector signal that occurs with a time constant of around 300 ms ($\alpha_2^{-1}$. In earth viewing data, the effect of the second time constant is compensated by a recursive filter which uses the current and previously sampled digital counts to numerically remove the long exponential drift.)

FIG. 2a illustrates the physical causes of a bolometer's fast and slow time responses. The fast response is due to the heat flow to the detector mount, while the slow response is due to heat flow from the detector mount to the insulating disk. FIG. 2b shows an example of a detector output, when scanning onto a stationary target, where the first and second time constant effects are apparent.

The calibration measurement of radiometric gain of a CERES channel is described next. The calibration is done using a blackbody or a lamp calibration source of known radiant output, $L^c(\lambda)$, having a uniform spatial extent that overfills the CERES channel telescope's FOV. In a ground calibration, the CERES telescope scans onto a source and stares for several seconds, ensuring that both first and second time constant effects have periods sufficiently long to fully react. Source uniformity and calibration long stare (i.e. $L(\lambda,\theta,\phi,t)=L(\lambda), t \rightarrow \infty$) allows simplification of Eqn. 1, as shown below with respect to Eqn. 2.

Since the source radiance and the telescope's spectral response are known, the CERES channel radiometric gain G may be found using Eqn. 3:

$$V_c(\infty) = g \int_0^{2\pi} P(\theta,\phi) \, d\Omega \times \int_0^{200} r(\lambda) L^c(\lambda) \, d\lambda \quad (2)$$

$$G = \frac{V_c(\infty)}{\int_0^{200} r(\lambda) L^c(\lambda) \, d\lambda} \quad (3)$$

$$= g \int_0^{2\pi} P(\theta,\phi) \, d\Omega \quad (4)$$

The gain value G may be used (as in Eqn. 6) to convert detector counts into measurements of unfiltered radiance from scene 'i', when viewing the earth:

$$f_i = \frac{\int_0^{200} r(\lambda) L^i(\lambda) \, d\lambda}{\int_0^{200} L^i(\lambda) \, d\lambda} \quad (5)$$

$$\int_0^{200} L^i(\lambda) \, d\lambda = \frac{V_i(t)^*}{G \times f_i} \quad (6)$$

The filtering factor $f_i$ may be calculated using the spectral response and a Modtran spectrum for the particular earth scene 'i'. The asterisk in $V_i(t)^*$ indicates that the detector output (for ERB data only) has been through a recursive filter that compensates for the second time constant effect. Importantly, this gain value may be applied in Eqn. 6, only if the CERES telescope's FOV is overfilled with radiance.

FIG. 3a shows a CERES telescope performing a raster scan of the moon. The telescope is fixed in elevation and rotating, back and forth, in azimuth in the raster scan mode. The CERES FOV is 1.3°×2.6° in order to obtain a 25 km sized footprint, when viewing the earth at nadir (90 degrees elevation). The figure shows the raster scan of the moon, as CERES is orbiting the earth. It will be appreciated that the elevation angle is changing, because of the CERES orbit around the earth. The telescope's FOV is shown in the enclosed highlighted area. FIG. 3b shows an example of the radiometric output from the CERES SW detector during a lunar raster scan.

As shown in FIG. 3a, when the CERES telescope is oriented to view the moon, the lunar radiance fills only 10% of the PSF. Such extreme under-filling of the CERES FOV and lack of an accurate known PSF shape, $P(\theta,\phi)$, imply that the standard inversion of Eqn. 6 cannot be used to derive measurements of lunar radiance. Furthermore, the finite time response of the CERES bolometers adds complications to any attempt to derive lunar radiance from a CERES raster scan across the moon.

It will be appreciated that the moon has been used by space based earth observing instruments, such as the SeaWIFS radiometer, as a radiative target to maintain calibration stability of scattered solar channels. The average reflectivity, or albedo of the entire lunar surface is believed to remain constant at a level better than $10^{-8}$ per decade. Monthly views of the moon, thus, allow space based photodiode gains to be adjusted, yielding good stability to earth observation measurements. An accurate figure of broadband lunar albedo, however, has never been measured from space. This is because photodiodes are narrowband detectors and cannot be used to estimate broadband albedo with high accuracy.

As will be explained below, the present invention includes a system and method for mapping the PSF shapes, $P(\theta,\phi)$, of the CERES instruments, when performing raster scans of the moon; and using the data to measure the moon's radiant output. In addition, the present invention contemplates a system and method for performing raster scans of the sun, in order to calibrate the CERES instruments, so that they may be used to accurately estimate the albedo of the earth.

It will be appreciated that although raster scan of the moon is described below, the present invention may be used to raster scan any celestial body, for example, the sun, in order to calibrate any radiometric system, for which CERES is only one example.

SUMMARY OF THE INVENTION

To meet this and other needs, and in view of its purposes, the present invention provides a system for calibrating a broadband detector. The system includes a narrowband telescope for viewing a celestial body, and an earth viewing telescope. A broadband detector is selectively coupled to the narrowband telescope or the earth viewing telescope. A narrowband filter is selectively inserted in an optical path of the narrowband telescope or the earth viewing telescope. A processor is configured to calibrate the broadband detector based on viewing the celestial body with the narrowband telescope or the earth viewing telescope, and selectively inserting the narrowband filter in the optical path.

The narrowband telescope includes a first narrowband filter in its optical train. The narrowband filter, which is selectively inserted in the optical path, is spectrally similar to the first narrowband filter in the optical train of the narrowband telescope.

The system includes a gimbaled platform for receiving the narrowband telescope and the earth viewing telescope. The gimbaled platform is configured to provide elevation and azimuth rotation of the narrowband telescope and the earth viewing telescope for viewing the celestial body.

The narrowband filter is fixed in elevation with respect to a housing of the system. The gimbaled platform is configured to rotate the narrowband telescope and the earth viewing telescope on an elevation axis, so that the narrowband filter is selectively inserted in the optical path of the narrowband telescope or the earth viewing telescope. The gimbaled platform is configured to rotate the narrowband telescope and the earth viewing telescope on an azimuth axis, in which the narrowband telescope and the earth viewing telescope are effective in azimuth scanning the celestial body.

The processor is configured to integrate radiative data received by the broadband detector when
 (a) the narrowband telescope views the celestial body without the first narrowband filter in the optical path,
 (b) the narrowband telescope views the celestial body with the first narrowband filter in the optical path, and
 (c) the earth viewing telescope views the celestial body with the first narrowband filter in the optical path.

The celestial body is the sun. The narrowband telescope includes a field-of-view (FOV). When the narrowband telescope views the celestial body, the celestial body under-fills the FOV.

The narrowband telescope includes first and second narrowband telescopes having, respectively, first and second narrowband filters in its optical path for viewing the celestial body. The narrowband filter includes first and second narrowband filters. The first narrowband filter is spectrally matched to the first narrowband filter of the first telescope, and the second narrowband filter is spectrally matched to the second narrowband filter of the second telescope. The narrowband telescope and the earth viewing telescope view the celestial body while orbiting the earth.

Another embodiment of the present invention includes a method of obtaining radiation data. The method includes the steps of:
 (a) obtaining first radiation data by scanning a first celestial body using a narrowband filtered telescope;
 (b) obtaining second radiation data by scanning the first celestial body using an external narrowband filter inserted in an optical path of the narrowband filtered telescope;
 (c) calibrating the external narrowband filter using steps (a) and (b);
 (d) calibrating an imager by obtaining third radiation data by scanning the first celestial body using the external narrowband filter inserted in an optical path of the imager; and
 (e) imaging a second celestial body using the imager.

Scanning the first celestial body includes scanning the sun. Scanning the second celestial body includes scanning the earth. Scanning the first celestial body includes raster scanning the celestial body while orbiting the earth. Raster scanning includes scanning the celestial body by rotating, back and forth, the narrowband filtered telescope in azimuth, and fixing the narrowband filtered telescope in elevation.

Obtaining radiation data includes using the narrowband filtered telescope with an internal narrowband filter that is spectrally the same as the external narrowband filter.

Step (c) of the method includes obtaining a ratio between an integral of the first radiation data and an integral of the second radiation data.

Yet another embodiment of the present invention includes a method of scanning a celestial body comprising the steps of:
  (a) scanning a celestial body using the following sequence:
    (i) scanning the celestial body using a first optical path having a first narrowband filter,
    (ii) scanning the celestial body using the first optical path having the first narrowband filter and a second narrowband filter,
    (iii) scanning the celestial body using an imager with a second optical path including the second narrowband filter inserted in the second optical path; and
  (b) scanning another celestial body using the imager with the second optical path and without the second narrowband filter inserted therein.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures:

FIG. 3b is an example of radiative data obtained when performing a raster scan of the moon as shown in FIG. 3a.

DETAILED DESCRIPTION OF THE INVENTION

As explained below, the present invention includes a system and method for mapping the PSF shapes, $P(\theta,\phi)$, of the CERES instruments, when performing raster scans of the moon; and using the data to measure the moon's radiant output. In addition, the present invention contemplates a system and method for performing raster scans of the sun, in order to calibrate an earth viewing CERES telescope, so that it may accurately estimate the albedo of the earth.

It will be appreciated that although raster scan of the moon is described below, the present invention may be used to raster scan any celestial body, for example, the sun.

For purposes of mapping the PSF shapes, $P(\theta,\phi)$, the CERES instruments perform regular raster scans of the moon. These scans are obtained at sunrise for the Terra instruments and at sunset for those on Aqua, in order to avoid telescope exposure to the ram direction and the degradation it may cause.

Figure 1A:
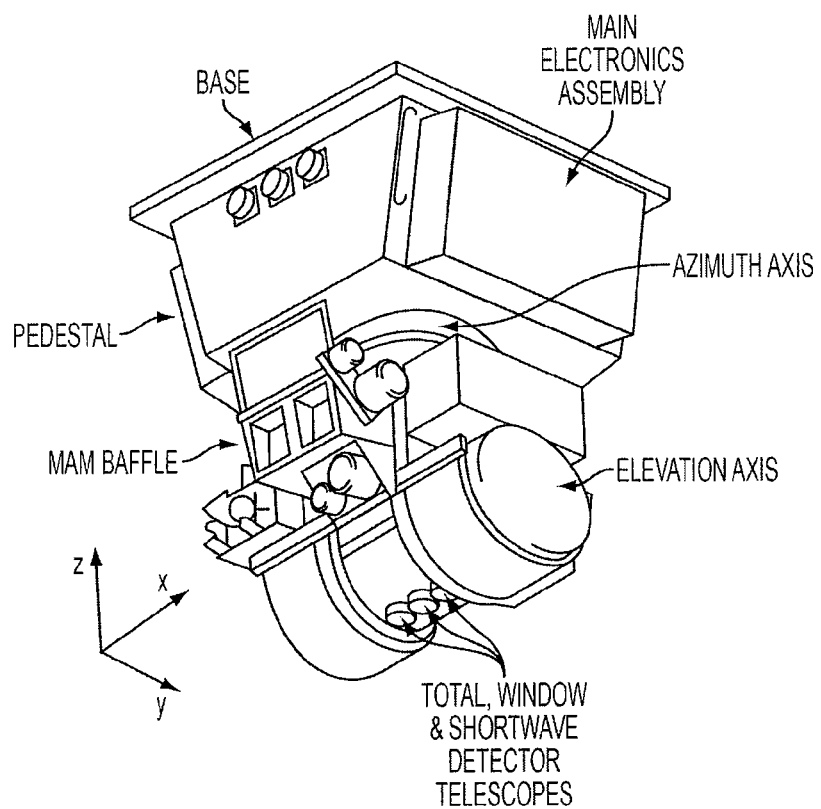
FIG. 1a is a perspective view of the CERES radiometer including three telescopes.
Figure 1B:
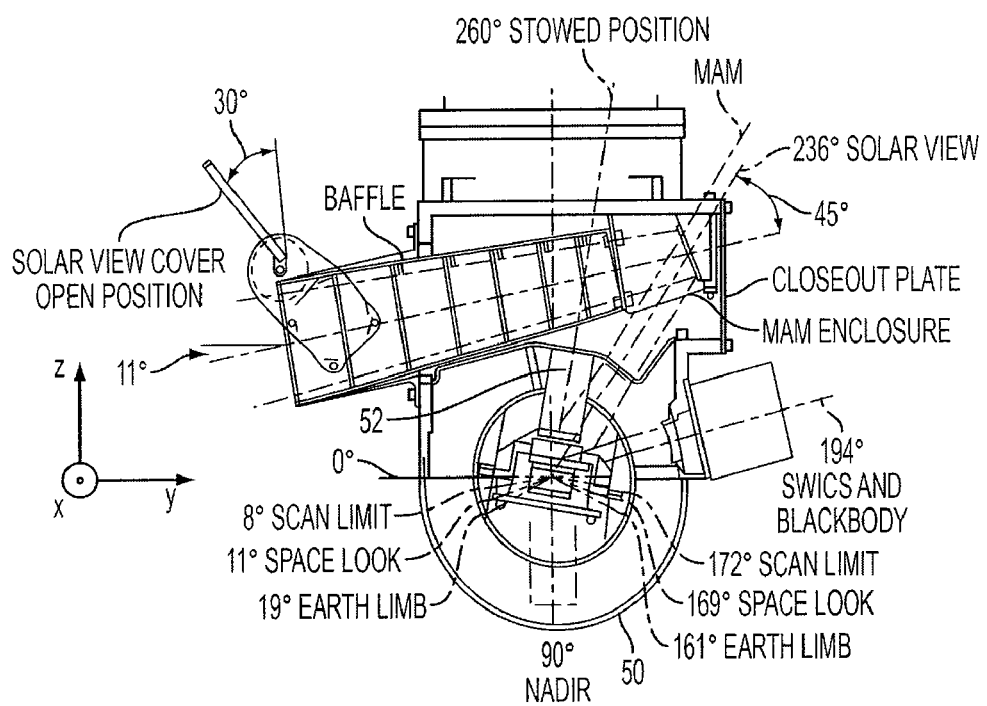
FIG. 1b is a cross-sectional view of the CERES radiometer, showing the casing of the CERES radiometer and one telescope positioned, in elevation, in a stowed position.
Figure 1C:
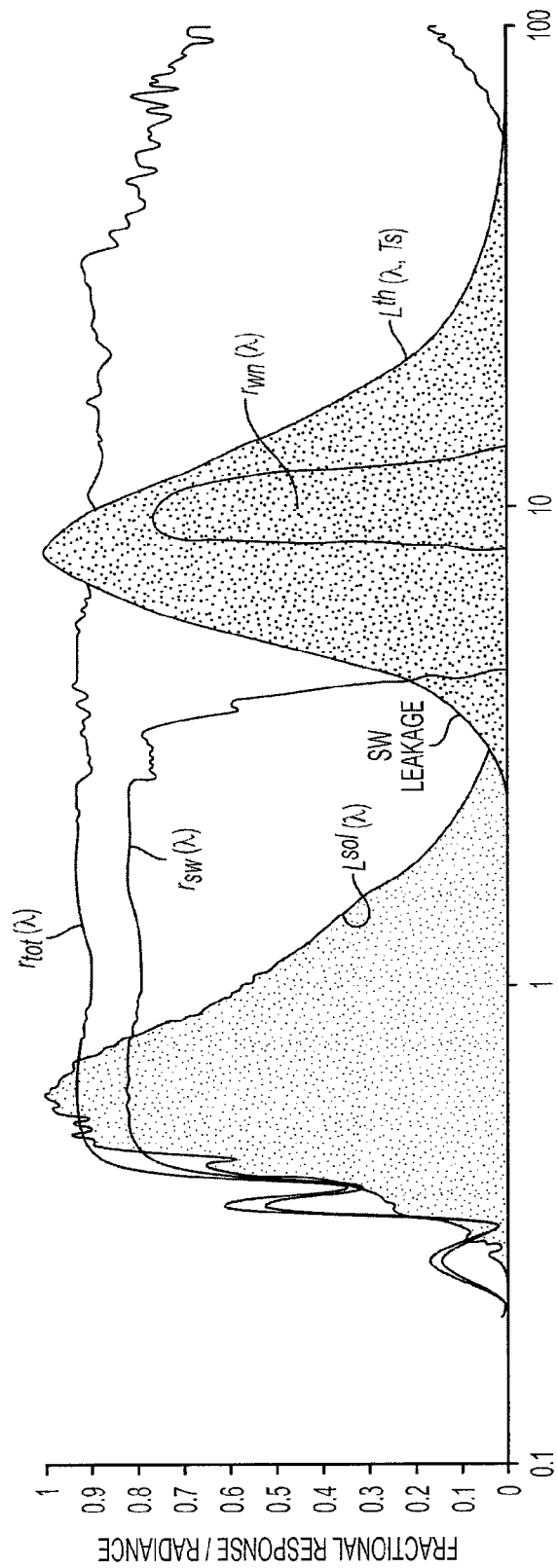
FIG. 1c are examples of radiative data obtained by the total channel, the SW channel and the window channel for the CERES radiometer, when viewed against a background of thermal lunar radiation and solar radiation.
Figure 2A:
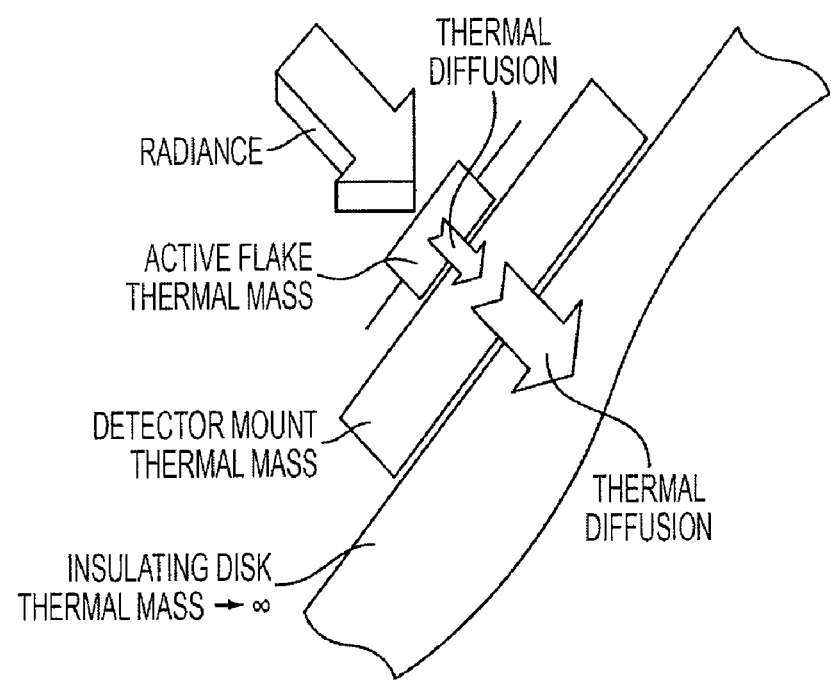
FIG. 2a is a functional diagram showing fast and slow time responses of a bolometer detector due to heat flow from one surface to another.
Figure 2B:
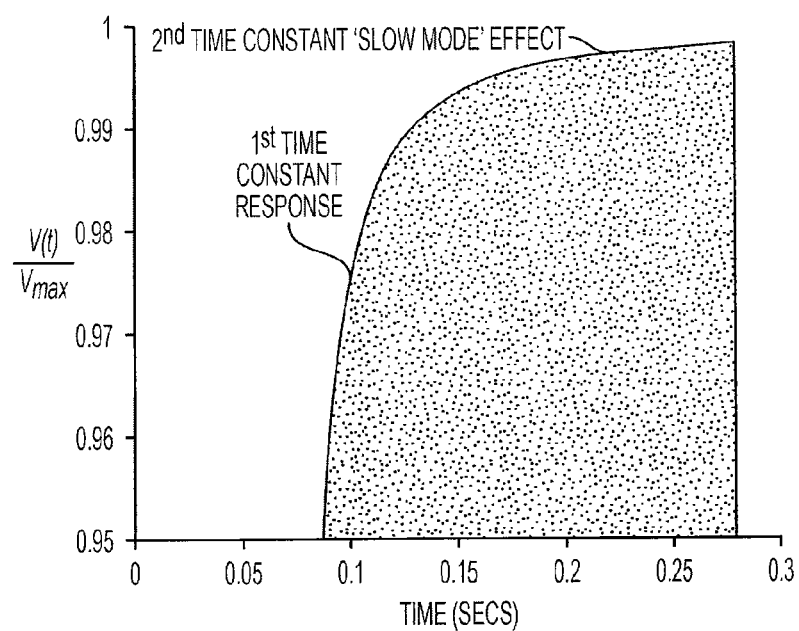
FIG. 2b is an example of a detector output scanning a stationary target and illustrates fast and slow responses of the detector.
Figure 3A:
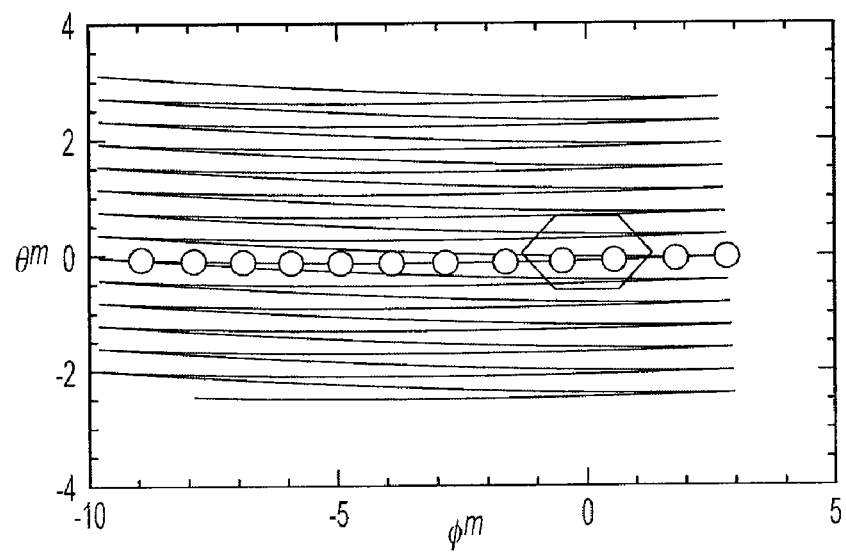
FIG. 3a is an example of a raster scan of the moon (or the sun), where the moon (or the sun) under-fills the FOV of a scanning telescope.

The elevation scan head of the CERES instruments (as shown in FIGS. 1a and 1b), or any radiometric instruments, may be held fixed, while the azimuth of the instruments are rotated back and forth. In this manner, the moon zigzags through the telescope's field-of-view (FOV), as shown in FIG. 3a.

The detector output $V_m(t)$ from the raster scan data (for example as shown in FIG. 1b) may be mathematically represented as follows:

$$H(t)=\alpha_1\eta_i\exp(-\alpha_1 t)+\alpha_2\eta_2\exp(-\alpha_2 t) \quad (7)$$

$$M(\theta,\phi) = \int_0^{200} r(\lambda)L^m(\lambda,\theta,\phi)d\lambda \quad (8)$$

$$V_m(\theta^m(t),\phi^m(t)) = \quad (9)$$
$$g\int_{-\infty}^t H(t-t')\int_0^{2\pi} P(\theta,\phi) \times M(\theta-\theta^m(t'),\phi-\phi^m(t'))d\Omega dt'$$

$$M(\theta-\theta^m(t'),\phi-\phi^m(t'))d\Omega dt' \quad (9)$$

where $H(t)$ is the impulse response of the CERES bolometer and $L^m(\lambda,\theta,\phi)$ is the spectrally and spatially resolved radiance from the moon. Furthermore, $\lambda,\theta,\phi$ are wavelength, elevation and azimuth, respectively.

Eqn. 9 shows that the detector output is the result of a convolution in time and angular space between the impulse response $H(t)$, the PSF $P(\theta,\phi)$ and the filtered lunar radiance $M(\theta,\phi)$. This allows use of the mathematical property that the integral of a function which is itself the convolution of multiple functions, gives the product of each function's integral:

$$Z = \int_{-\infty}^{\infty}\int_{-\infty}^t X(t')Y(t-t')dt'\,dt \quad (10)$$

$$= \int_{-\infty}^{\infty} X(t)dt \times \int_{-\infty}^{\infty} Y(t)dt \quad (11)$$

It is, therefore, possible to use Eqn. 13 as a representation of an integral of CERES lunar raster scan data over all angular space:

$$F_m = \int_0^{2\pi} V_m(\theta^m, \phi^m) d\Omega \qquad (12)$$

$$= g \int_0^{2\pi} P(\theta, \phi) d\Omega \times \int_0^{\infty} H(t) dt \times \int_0^{2\pi} M(\theta, \phi) d\Omega \qquad (13)$$

$$\int_0^{\infty} H(t) dt = 1 \qquad (14)$$

$$g \int_0^{2\pi} P(\theta, \phi) d\Omega = G \qquad (15)$$

$$F_m = G \int_0^{2\pi} M(\theta, \phi) d\Omega \qquad (16)$$

Therefore, when the integration of Eqn. 12 is performed on the CERES detector output during a lunar raster scan, the result is the radiometric gain G (as in Eqns. 4 and 15) multiplied by the disk integrated filtered radiance from the moon (as in Eqn. 16).

If $R_{eq}$ & $R_{pol}$ are the equatorial and polar radii of the moon (1738.14 km and 1735.97 km) and $D_{sm}$ is the distance between the satellite and the moon, Eqn. 17 provides the angular extent of the moon. That may be used to give the mean filtered radiance 'K' leaving the lunar disk:

$$\Delta\Omega_m = 2\pi \left( 1 - \left( 1 - \frac{R_{eq} R_{pol}}{D_{sm}^2} \right)^{\frac{1}{2}} \right) \qquad (17)$$

$$K = \frac{F_m}{G \times \Delta\Omega_m} \qquad (18)$$

Figure 3B:
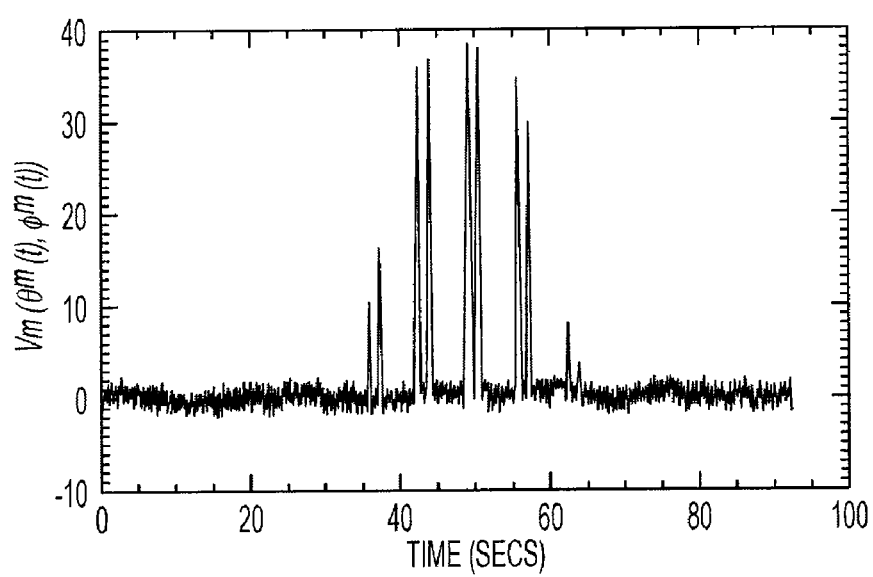

This accounts for the lack of precise knowledge on the PSF shape and detector time response. It also gives the advantage that by integrating over thousands of samples the signal to noise of 'K' is much increased (note in FIG. 3b that the lunar radiance produces a small signal from the SW detector of about 35 counts, compared to a 1000 count signal from a typical earth scene).

Figure 4:
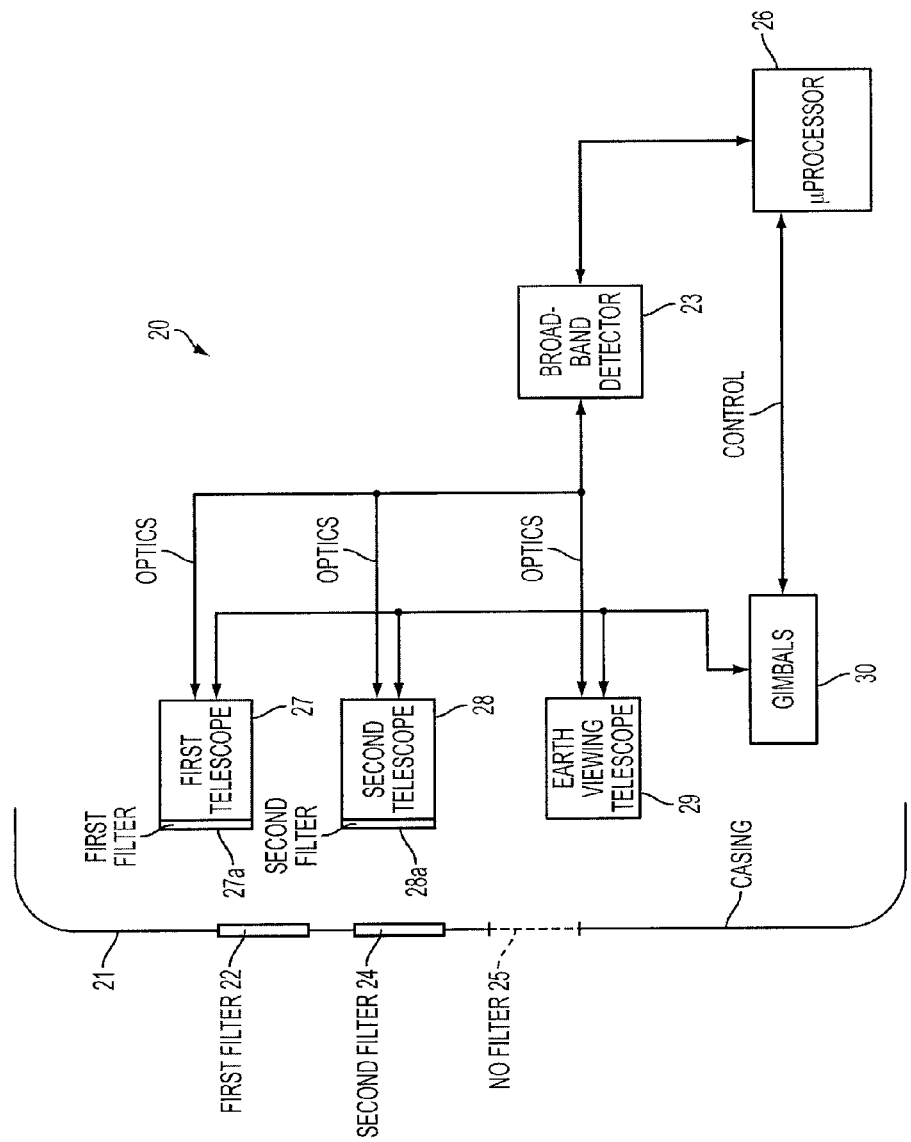
FIG. 4 is block diagram of a radiometric system in accordance with an embodiment of the present invention.

Based on the above equations, the present invention provides a system and method for calibrating a space based radiometer for monitoring ERB by using the sun as a calibration reference. A functional block diagram of a radiometric system, generally designated as 20, is shown in FIG. 4. The radiometric system 20 includes a broadband detector, generally designated as 23, coupled through an optical train to a plurality of telescopes 27, 28 and 29. As an example, the broadband detector may include a bolometer. First telescope 27 is equipped with a first narrowband filter 27a (for example red). Second telescope 28 is equipped with a second narrowband filter 28a (for example blue). The earth viewing telescope does not have a narrowband filter and, hence, would saturate or damage the broadband detector, if allowed to view the sun directly. Gimbals 30 are controlled, by way of commands from microprocessor 26, to provide azimuth and elevation movements to a scan head (not shown). The scan head, in turn, provides a raster scan to the three telescopes positioned around the scan head (see FIG. 5b, for example).

The casing 21, or housing 21 of radiometer system 20 includes three windows providing first narrowband filter 22, second narrowband filter 24 and window 25. It will be understood that the first filter 22 is identical to the first filter 27a and the second filter 24 is identical to the second filter 28a.

As shown schematically in FIG. 4, gimbals 30 provide an elevation movement to the three telescopes so that they may be positioned relative to casing 21. For example, first telescope 27 may be moved to view a celestial body through first filter 22 and through window 25. Similarly, second telescope 28 may be moved to view a celestial body through second filter 24 and through window 25. In addition, telescope 29 may be moved to view a celestial body through first filter 22, second filter 24 and window 25. The physical positions of each telescope with respect to the casing of the radimetric system may be better seen by reference to FIGS. 5b through 5d.

Figure 5A:
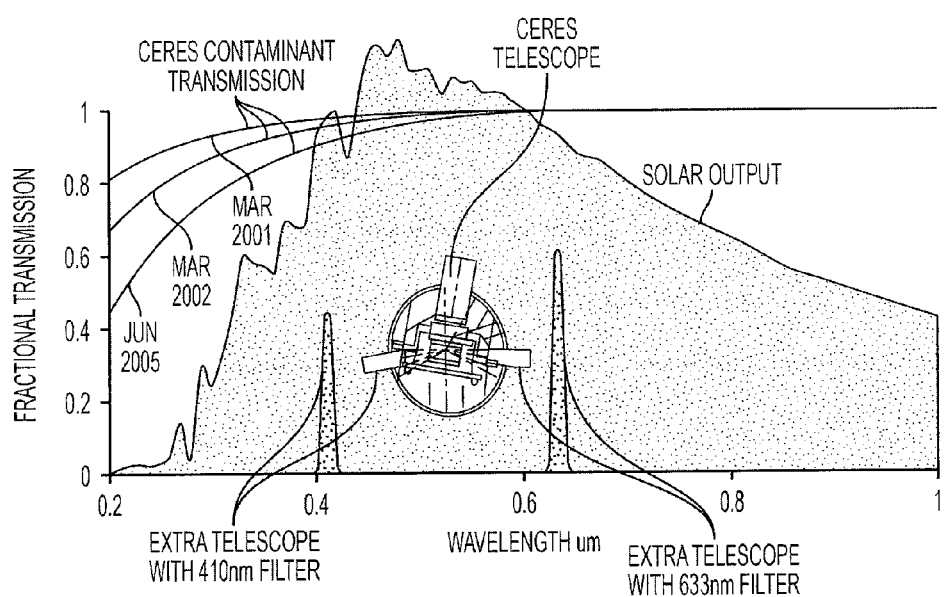
FIG. 5a is a plot of the radiation spectrum of two narrowband filters incorporated into two telescopes, respectively, with the solar radiation spectrum shown in the background, in accordance with an embodiment of the present invention.

Returning to a discussion of the CERES radiometer, it will be appreciated that radiometric system 20 requires no additional moving parts, other than the moving parts that are already in the present CERES radiometer. As shown in FIG. 5a, two additional telescopes for each SW and total channels (also referred to herein, in general, as first and second telescopes) are contemplated, however, for addition to the rotating scan head 54. Preferably, these additional telescopes and detectors are identical to the earth viewing CERES telescope 52. It will be understood that narrowband detectors, such as photo-diodes are adequate, if they have sufficiently linear responses.

One of the two additional telescopes may be equipped with a blue narrowband interference filter in its optical train, while the other additional telescope may have a red narrowband interference filter in its optical train. In FIG. 5a, two extra telescopes are shown mounted on the rotating scan head 54 of the CERES radiometer. These two extra telescopes are disposed on each side of the earth viewing CERES telescope 52, as shown. The two extra telescopes, respectively, are equipped with a 410 nm filter (blue) and a 633 nm filter (red).

The exact central wavelengths of these filters are not that important, other than that each of their bandwidths be sufficiently narrow to allow direct viewing of the sun without saturating a detector. Central wavelengths of 410 nm (blue) and 633 nm (red) interference filters may be used considering the nature of contaminant transmission observed on the present CERES radiometer.

Another modification to the existing CERES radiometer is that for each extra telescope, an additional and identical narrowband filter is positioned on the instrument's casing 50. In other words, for the extra red filtered telescope, another identical red filter is positioned on the casing 50 under the SWICS and blackbody, immediately below 180 degrees elevation. For the extra blue filtered telescope, another identical blue filter is positioned on the casing 50, immediately below the 0 degree elevation. The elevation positions of the blue and red filters on the casing of the CERES radiometer are shown in FIG. 5b.

Figure 5B:
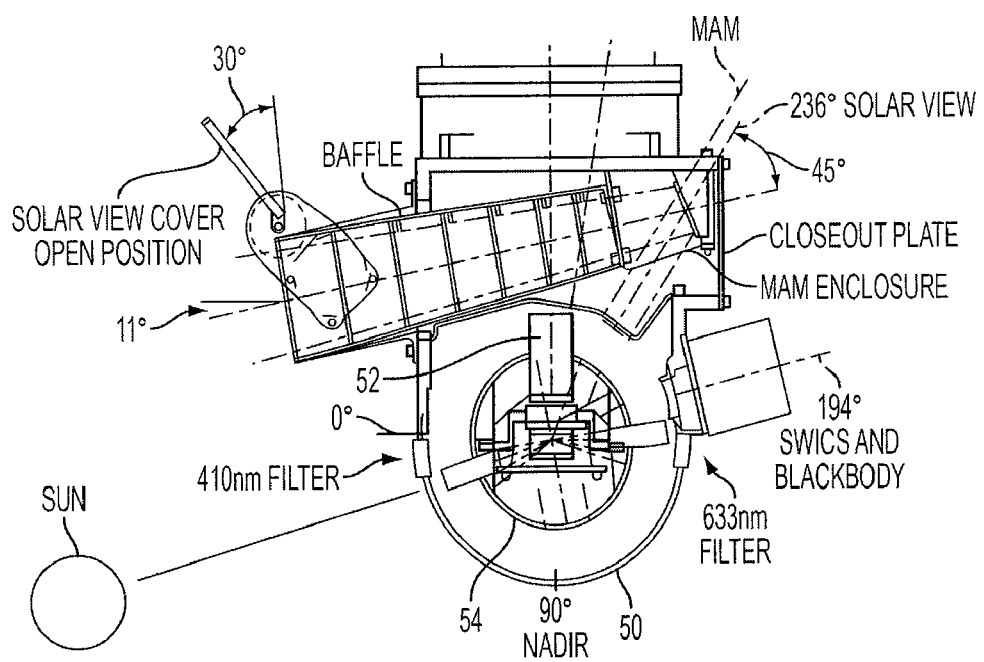
FIG. 5b is a sectional view of a next generation CERES radiometric system (CERES II) showing two narrowband filtered telescopes added to the scan head of CERES II, and two additional narrowband filters added to the casing of CERES II, in accordance with an embodiment of the present invention.
Figure 5C:
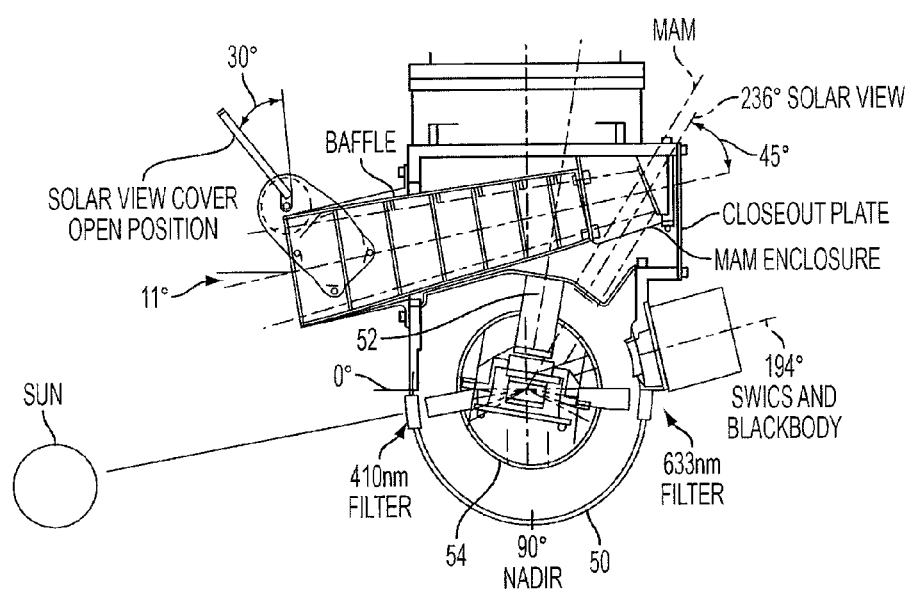
FIG. 5c is a sectional view of the two narrowband filtered telescopes shown in FIG. 5b, when positioned at a different elevation angle with respect to the casing of CERES II, in accordance with an embodiment of the present invention.

For a radiometric system, such as the next version of CERES (CERES II), equipped with one extra red telescope and one extra blue telescope disposed on the scan head (for example, the 410 nm telescope and the 633 nm telescope), and one corresponding additional red filter and one corresponding additional blue filter disposed on the casing of the radiometer (for example the 410 nm filter and the 633 nm filter), the present invention provides accurate calibration of an existing earth viewing telescope by performing solar calibration. The calibration process of the present invention includes the following steps:

First, the extra telescope (for example, the blue telescope) is positioned as shown in FIG. 5b and a raster scan of the sun is performed, in the same manner as a raster scan of the moon. As shown, the blue telescope raster scans the sun by viewing through casing 50 without any additional filter in the optical path.

Second, another raster scan of the sun on the following orbit is performed. However, this time the blue telescope (as an example) is at the elevation position shown in FIG. 5c, so that two narrowband blue filters are in the optical train (namely, the filter in the extra blue telescope and the identical blue narrowband filter disposed on casing 50).

For each of the above two steps, an integration using the form of Eqn. 12 is performed on the detector counts. The ratio of the integrals formed by Eqn. 12, between the first step (FIG. 5b) and the second step (FIG. 5c), provides the changes to the absolute transmission of the narrowband filter disposed on the instrument's casing. In the example shown, the throughput of the blue filter is computed.

Figure 5D:
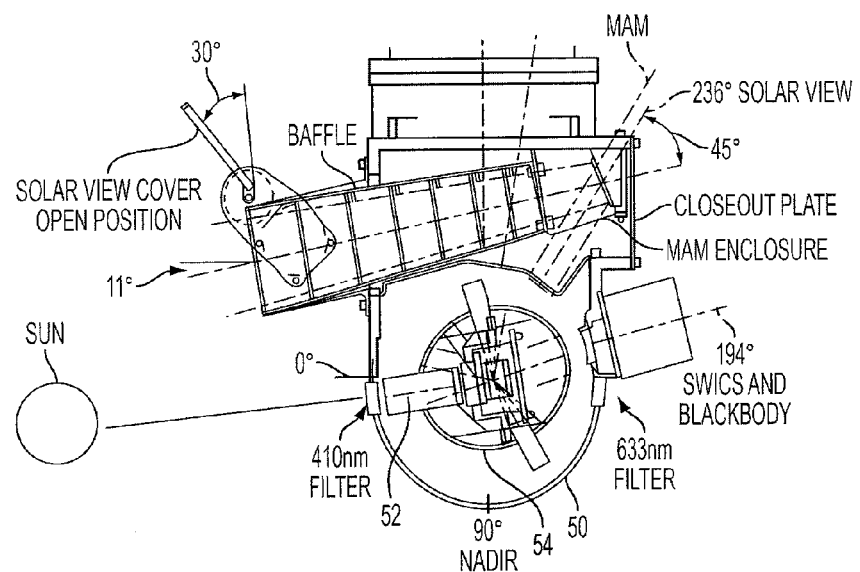
FIG. 5d is a sectional view of the two narrowband filtered telescopes shown in FIG. 5b, when positioned at still another elevation angle with respect to the casing of CERES II, in accordance with an embodiment of the present invention.

The final and third step includes the earth viewing telescope, designated as 52, performing a raster scan of the sun through the same narrowband filter, with its transmission change now known, as shown in FIG. 5d.

The above enumerated three steps may be performed on multiple orbits for both the blue and red filters every month (ensuring, however, that the telescopes avoid the ram direction exposure that is largely the cause of spectral darkening). This permits real-time tracking of changes to the absolute throughput of the earth viewing telescopes at two specific wavelengths (for example, blue and red). The spectral responses may thus be updated accordingly, using an appropriate spectral darkening curve. If knowledge of the filter spectral transmission is sufficiently accurate, the present invention permits a check on the absolute SW radiometric scale of future ERB instruments, such as telescope 52 (i.e. because the precise energy throughput of the filter would be known).

Figure 6:
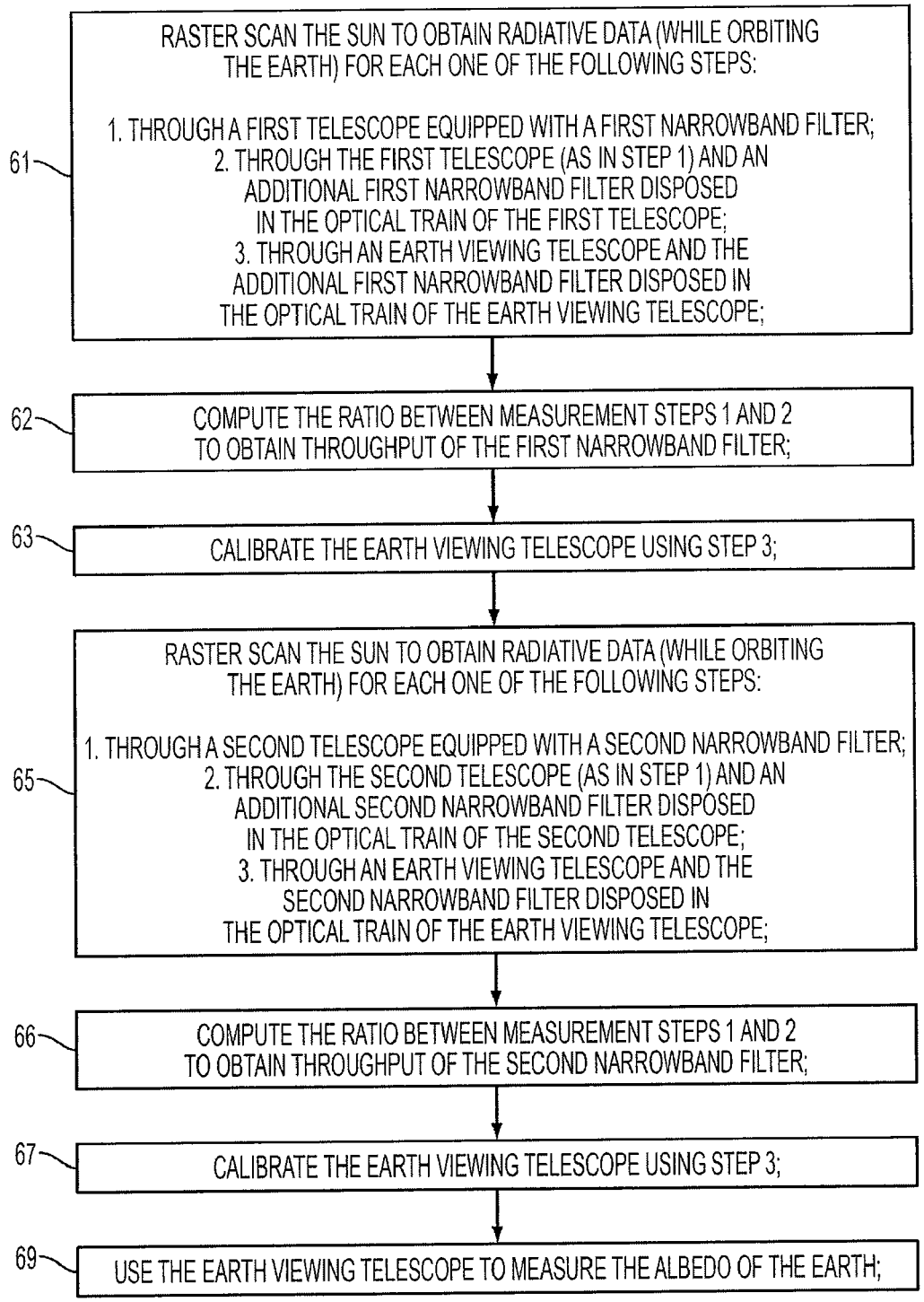
FIG. 6 is a flow diagram of an exemplary method of the present invention.

The above process is shown as a flow diagram in FIG. 6. Steps 61, 62 and 63 perform raster scans of the sun using a first extra telescope equipped with a first narrowband filter, while viewing the sun through the instrument's casing with and without a corresponding first narrowband filter disposed on the casing. After the throughput of the first narrowband filter is computed, the earth viewing telescope may stare through the first narrowband filter disposed on the casing and be calibrated, as it is raster scanning the sun.

Next, steps 65, 66 and 67 perform raster scans of the sun using a second extra telescope equipped with a second narrowband filter, while viewing the sun through the instrument's casing with and without a corresponding second narrowband filter disposed on the casing. After the throughput of the second narrowband filter is computed, the earth viewing telescope may stare through the second narrowband filter disposed on the casing and be calibrated, while raster scanning the sun.

Thus, the earth viewing telescope is now calibrated at two different wavelengths (for example, red and blue). Step 69 may now image the earth using the calibrated earth viewing telescope and obtain accurate albedo data of the earth at two separate wavelengths.

In summary, a system and method of determining a disk integrated radiative output from a celestial body, whose angular extent under fills a space based telescope of a radiometric system, has been described. The present invention, in an example, was specifically applied to raster scan the moon, by using the present CERES telescopes on the Terra and Aqua platforms.

In addition, the present invention provides a system and method which may be used by the next generation CERES radiometer (CERES II) for raster scanning the sun. Furthermore, by adding two new narrowband filtered telescopes on the scan head and adding two new narrowband filters to the casing of the instrument, the present invention may raster scan the sun and calibrate the earth viewing telescope, so that it may accurately measure the earth's albedo at two separate wavelengths. This will improve ERB data accuracy and stability for future missions measuring the earth's albedo.

Moreover, the present invention is equally applicable for telescopes overfilled by the moon, such as geo-stationary imagers and spectrometers, many of which are currently in orbit without on-board calibration systems. Thus, the present invention provides a method in which the moon may be used to bring measurements from past and future satellite instruments into a common radiometric scale. This will also improve the length and quality of data vital for use by the climate community.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for calibrating a broadband detector comprising:
   a narrowband telescope for viewing a celestial body,
   an earth viewing telescope,
   a broadband detector selectively coupled to the narrowband telescope or the earth viewing telescope,
   a narrowband filter selectively inserted in an optical path of the narrowband telescope or the earth viewing telescope, and
   a processor configured to calibrate the broadband detector based on viewing the celestial body with the narrowband telescope or the earth viewing telescope, and selectively inserting the narrowband filter in the optical path.

2. The system of claim 1 wherein
   the narrowband telescope includes a first narrowband filter in its optical train, and
   the narrowband filter selectively inserted in the optical path is spectrally similar to the first narrowband filter in the optical train of the narrowband telescope.

3. The system of claim 2 including
   a gimbaled platform for receiving the narrowband telescope and the earth viewing telescope,
   wherein the gimbaled platform is configured to provide elevation and azimuth rotation of the narrowband telescope and the earth viewing telescope for viewing the celestial body.

4. The system of claim 3 wherein
   the narrowband filter is fixed in elevation with respect to a housing of the system, and
   the gimbaled platform is configured to rotate the narrowband telescope and the earth viewing telescope on an elevation axis, so that the narrowband filter is selectively inserted in the optical path of the narrowband telescope or the earth viewing telescope.

5. The system of claim 3 wherein
   the gimbaled platform is configured to rotate the narrowband telescope and the earth viewing telescope on an azimuth axis, in which the narrowband telescope and the earth viewing telescope are effective in azimuth scanning the celestial body.

6. The system of claim 1 wherein
   the processor is configured to integrate radiative data received by the broadband detector when
   (a) the narrowband telescope views the celestial body without the first narrowband filter in the optical path,
   (b) the narrowband telescope views the celestial body with the first narrowband filter in the optical path, and (c) the earth viewing telescope views the celestial body with the first narrowband filter in the optical path.

7. The system of claim 6 wherein the celestial body is the sun.

8. The system of claim 1 wherein
the narrowband telescope includes a field-of-view (FOV), and
when the narrowband telescope views the celestial body, the celestial body under-fills the FOV.

9. The system of claim 1 wherein
the narrowband telescope includes first and second narrowband telescopes having, respectively, first and second narrowband filters in its optical path for viewing the celestial body, and
the narrowband filter includes first and second narrowband filters;
the first narrowband filter is spectrally matched to the first narrowband filter of the first telescope, and
the second narrowband filter is spectrally matched to the second narrowband filter of the second telescope.

10. The system of claim 1 wherein
the narrowband telescope and the earth viewing telescope view the celestial body while orbiting the earth.

11. A method of obtaining radiation data comprising the steps of:
(a) obtaining first radiation data by scanning a first celestial body using a narrowband filtered telescope;
(b) obtaining second radiation data by scanning the first celestial body using an external narrowband filter inserted in an optical path of the narrowband filtered telescope;
(c) calibrating the external narrowband filter using steps (a) and (b);
(d) calibrating an imager by obtaining third radiation data by scanning the first celestial body using the external narrowband filter inserted in an optical path of the imager; and
(e) imaging a second celestial body using the imager.

12. The method of claim 11 wherein
scanning the first celestial body includes scanning the sun, and
scanning the second celestial body includes scanning the earth.

13. The method of claim 11 wherein
scanning the first celestial body includes raster scanning the celestial body while orbiting the earth.

14. The method of claim 13 wherein
raster scanning includes
scanning the celestial body by rotating, back and forth, the narrowband filtered telescope in azimuth, and
fixing the narrowband filtered telescope in elevation.

15. The method of claim 11 wherein
obtaining radiation data includes using the narrowband filtered telescope with an internal narrowband filter that is spectrally the same as the external narrowband filter.

16. The method of claim 11 wherein
step (c) includes obtaining a ratio between an integral of the first radiation data and an integral of the second radiation data.

17. The method of claim 11 wherein
scanning the first celestial body includes providing a field-of-view (FOV) for the narrowband filtered telescope which over-fills a radiative footprint from the first celestial body.

18. A method of scanning a celestial body comprising the steps of:
(a) scanning a celestial body using the following sequence:
(i) scanning the celestial body using a first optical path having a first narrowband filter,
(ii) scanning the celestial body using the first optical path having the first narrowband filter and a second narrowband filter,
(iii) scanning the celestial body using an imager with a second optical path including the second narrowband filter inserted in the second optical path; and
(b) scanning another celestial body using the imager with the second optical path and without the second narrowband filter inserted therein.

19. The method of claim 18 wherein
scanning the celestial body includes scanning the sun, and
scanning the other celestial body includes scanning the earth.

20. The method of claim 19 wherein
scanning includes raster scanning the sun using a FOV that over-fills a radiation footprint from the sun.

* * * * *